(12) United States Patent
Keating et al.

(10) Patent No.: US 11,809,901 B2
(45) Date of Patent: *Nov. 7, 2023

(54) MIGRATING THE RUNTIME STATE OF A CONTAINER BETWEEN TWO NODES

(71) Applicant: RED HAT, INC., Raleigh, NC (US)

(72) Inventors: Aiden Keating, Waterford (IE); Jason Madigan, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,029

(22) Filed: Jul. 25, 2022

(65) Prior Publication Data

US 2022/0357981 A1 Nov. 10, 2022

Related U.S. Application Data

(63) Continuation of application No. 16/599,014, filed on Oct. 10, 2019, now Pat. No. 11,436,042.

(51) Int. Cl.
*G06F 9/48* (2006.01)
*G06F 9/455* (2018.01)
*A63F 13/30* (2014.01)
*H04L 67/10* (2022.01)

(52) U.S. Cl.
CPC ............ *G06F 9/4856* (2013.01); *A63F 13/30* (2014.09); *G06F 9/455* (2013.01); *A63F 2300/40* (2013.01); *H04L 67/10* (2013.01)

(58) Field of Classification Search
None
See application file for complete search history.

(56) References Cited

U.S. PATENT DOCUMENTS

| | | |
|---|---|---|
| 9,558,216 B2 | 1/2017 | Florendo et al. |
| 10,061,520 B1 | 8/2018 | Zhao et al. |
| 10,225,341 B2 | 3/2019 | Howard et al. |
| 10,313,178 B2 | 6/2019 | Kumar et al. |
| 2008/0104587 A1 | 5/2008 | Magenheimer et al. |
| 2018/0032410 A1 | 2/2018 | Kang et al. |

(Continued)

OTHER PUBLICATIONS

Ma et al., "Efficient Service Handoff Across Edge Servers via Docker Container Migration", College of William and Mary, SEC '17, Oct. 2017, located at par.nsf.gov/servlets/purl/10077232.

(Continued)

*Primary Examiner* — Eric C Wai
(74) *Attorney, Agent, or Firm* — Womble Bond Dickinson (US) LLP

(57) ABSTRACT

Embodiments of the present disclosure relate to migrating the in-memory state of a containerized application to a destination node. A processing device may transmit an availability request to each of one or more nodes and identify a destination node to which a container is to be migrated based on a response from each of the one or more nodes indicating resources available to provision a replica of the container. The processing device may determine whether the destination node comprises a replica of each base layer of a set of base layers of the container and if not, transmit a replica of each base layer the destination node is missing to the destination node. A snapshot of the container may be acquired and the set of base layers may be removed from the snapshot to generate a replica of the in-memory layer, which may be transmitted to the destination node.

20 Claims, 6 Drawing Sheets

(56) References Cited

U.S. PATENT DOCUMENTS

2018/0336229 A1  11/2018  Muehle et al.
2019/0377594 A1  12/2019  Xie et al.
2020/0104385 A1   4/2020  Zheng et al.

OTHER PUBLICATIONS

Machen et al.; "Poster: Migrating Running Applications Across Mobile Edge Clouds"; MobiCom '16: Proceedings of the 22nd Annual International Conference on Mobile Computing and Networking; Oct. 2016; pp. 435-436 (Year: 2016).

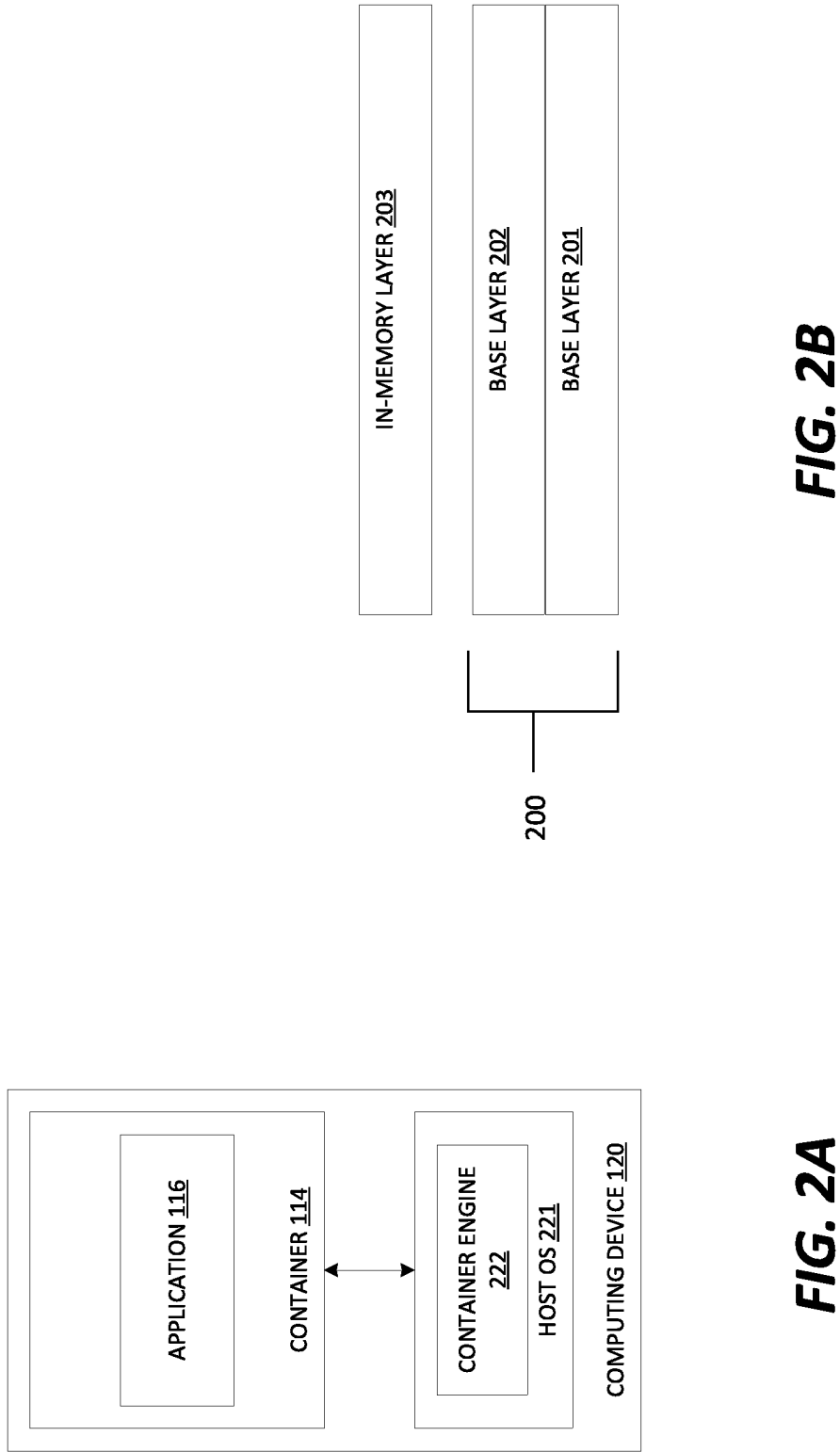

US 11,809,901 B2

MIGRATING THE RUNTIME STATE OF A CONTAINER BETWEEN TWO NODES

CROSS REFERENCE TO RELATED APPLICATIONS

This application claims priority to U.S. application Ser. No. 16/599,014, filed on Oct. 10, 2019 and entitled "MIGRATING THE RUNTIME STATE OF A CONTAINER BETWEEN TWO NODES," which is hereby incorporated by reference in its entirety.

TECHNICAL FIELD

Aspects of the present disclosure relate to containers, and more particularly, to migration of the run-time state (hereinafter referred to as the in-memory layer) of a container between host machines.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). An image file may be comprised of a set of base layers that define the runtime environment, as well as the packages and utilities necessary for a containerized application to run. A container may include the base layers from an image file as well as an in-memory layer in which the containerized application may write/modify data. The image file(s) for running a containerized application may be stored on a container engine that may execute on the operating system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram that illustrates an example container executing within a computing device, in accordance with some embodiments of the present disclosure.

FIG. 2B is a block diagram that illustrates an image file and the in-memory layer of a container, in accordance with some embodiments of the present disclosure.

DETAILED DESCRIPTION

Figure 1A:
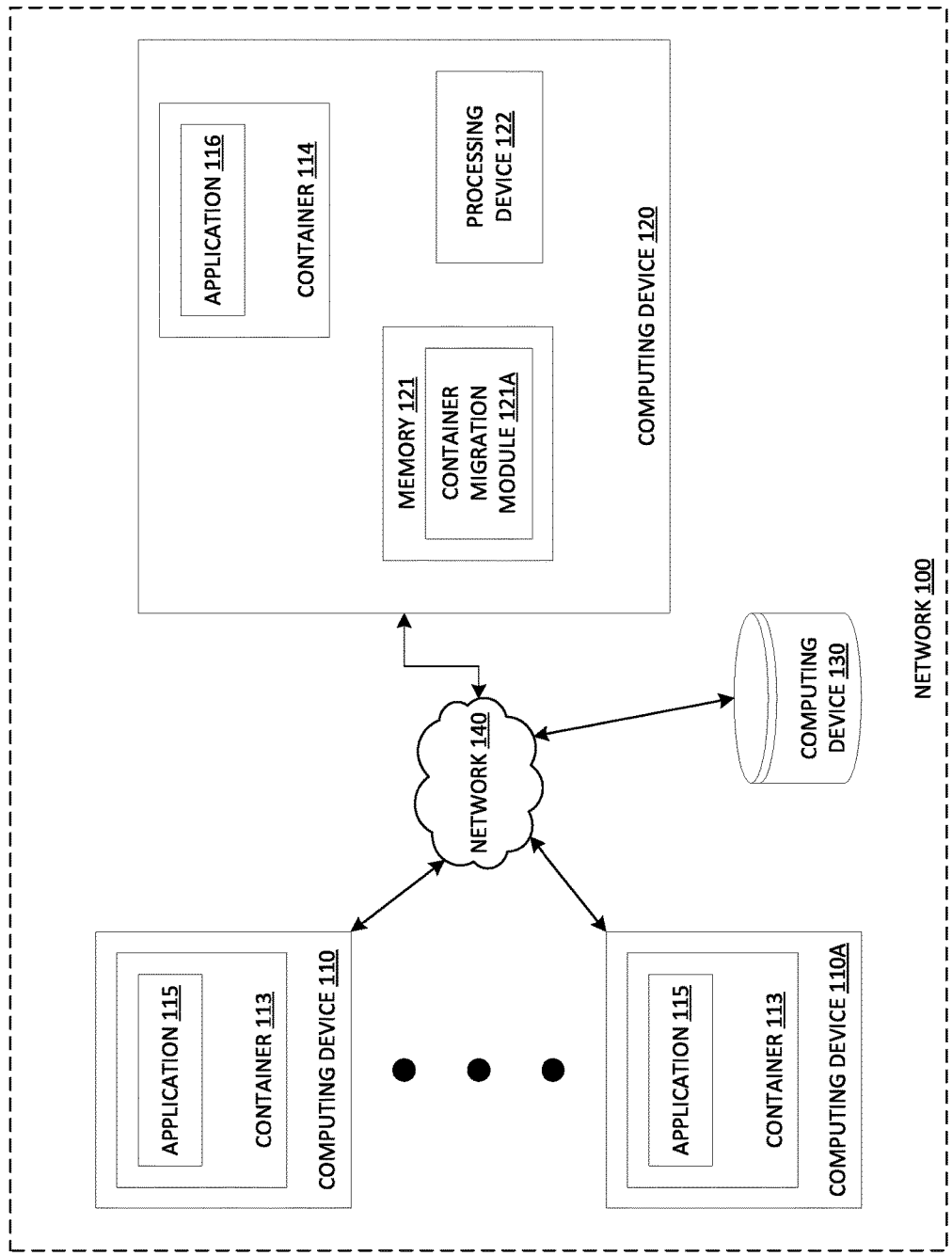
FIG. 1A is a block diagram that illustrates an example network, in accordance with some embodiments of the present disclosure.

When a host machine of a container needs to be decommissioned or restarted, any applications running on the container may be shut down while the host machine is brought back up or while the container is migrated to a new host machine. For applications that include long-running in-memory processes (e.g., those that write/modify significant amounts of data to the in-memory layer of the container during execution) this can cause a number of problems such as loss of data for a client that is using the application (since a new layer must be created for the changes to the in-memory layer to be saved). In addition, there may be a decrease in the quality of the user experience owing to having to wait for the host machine to restart or waiting to reconnect to a new host machine. This is especially problematic for applications that write large amounts of data in-memory, such as video games (e.g., mobile games, online/streaming games, console games, etc.), data analytics applications, and real-time data processing applications. For example, a real-time data processing application may involve long-running processing of data (and writing of the processed data in-memory) and simultaneous real-time streaming of the processed data (e.g., to a client device). Because the application has been running in-memory, shutting down the container may result in a loss of the processed data for the client device that is using the application. In another example, in a streaming video game, a player may lose their current progress from a previous save point. Even if the in-memory state is persisted, the user-experience of having to wait for the host machine to restart before reconnecting to the host machine or to a new host machine due to an issue that is beyond the player's control is problematic.

The present disclosure addresses the above-noted and other deficiencies by using a processing device to identify, from among a set of peer nodes, a destination node to which a container currently running on a source node is to be migrated. The container may include a set of base layers and an in-memory layer (e.g., a writable layer) in which data written by an application running within the container may be stored. The application may be any application that writes significant amounts of data to the in-memory layer of the container, such as a video game, data analytics application, or real-time data processing application. The data written in-memory may be streamed to a client device by the application, in one example. The processing device may determine whether the destination node includes a replica of each base layer of the set of base layers and if not, may transmit a replica of each base layer the destination node is missing to the destination node so that the destination node may include a second set of base layers that is a replica of the set of base layers. Upon successful transfer of the replica base layers to the destination node, the processing device may halt the stream of data from the application to the client device, and transfer a replica of the in-memory layer of the container to the destination node so that the destination node further includes a second in-memory layer that is a replica of the in-memory layer. Because base layers are generally significantly larger than an in-memory layer in terms of storage size, the processing device may wait until replicas of any missing base layers have been successfully transmitted to the destination node before halting the data stream and transferring the replica of the in-memory layer to the destination device. In this way, the amount of time the data stream being written to the client device must be interrupted may be minimized. The destination node may start a second container using the second set of base layers and the second in-memory layer, and the second container may host a second application that is a replica of the application on the source node. The source node may instruct the client device to disconnect from it and connect to the destination node, where the second application may resume writing the stream of data to the client device.

FIG. 1A is a block diagram that illustrates an example network 100. As illustrated in FIG. 1A, the network 100 includes a plurality of computing devices 110, computing device 120, a computing device 130 and a network 140. The computing devices 110, the computing device 120 and the computing device 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi hotspot connected with the network 140 and/or a wireless carrier system that can be implemented using various data processing equipment, communication towers (e.g. cell towers), etc. The network 140 may carry communications (e.g., data, message, packets, frames, etc.) between computing devices 110, 120 and 130. Each computing device 110, 120 and 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing devices 110, 120 and 130 may comprise any suitable type of computing device or machine that has a programmable processor including, for example, server computers, desktop computers, laptop computers, tablet computers, smartphones, set-top boxes, etc. In some examples, the computing devices 110, 120 and 130 may comprise a single machine or may include multiple interconnected machines (e.g., multiple servers configured in a cluster). The computing devices 110, 120 and 130 may be implemented by a common entity/organization or may be implemented by different entities/organizations. For example, a first computing device 110 may be operated by a first company/corporation and a second computing device 110 may be operated by a second company/corporation. Each computing device 110, 120 and 130 may execute or include an operating system (OS), as discussed in more detail below. The OS of a computing device 110, 120 and 130 may manage the execution of other components (e.g., software, applications, etc.) and/or may manage access to the hardware (e.g., processors, memory, storage devices etc.) of the computing device.

As illustrated in FIG. 1A, computing device 120 may include a container 114. In some embodiments, the container 114 may execute on a container engine (shown in FIG. 2A) which executes on top of the OS for computing device 120, as discussed in more detail below. The container engine may allow different containers to share the OS of a computing device (e.g., the OS kernel, binaries, libraries, etc.), as discussed in more detail below. The container engine may also perform other functions, as discussed in more detail below. The container 114 may be isolated, in that it is not connected to any other device or component of network 100, whether virtual or otherwise. Container 114 may execute application 116. In some embodiments, application 116 may be any application which requires large amounts of data to be stored in-memory. As used herein, in-memory may refer to the writable layer of a container which resides on top of the underlying base layers of the container which are read only as discussed in further detail herein. For example, application 116 may be a video game (e.g., mobile game, online/streaming game, console game, etc.), a data analytics application, or a data processing application etc. Computing device 130 may be a client node which is utilizing application 116. Computing device 130 may execute a client application (not shown in the figures) which may interact with application 116. As application 116 executes, it may write a stream of data to the computing device 130. More specifically, application 116 may write the stream of data to the in-memory layer of container 114, which may transmit the data stream to the client (computing device 130). For example, if application 116 is an online game, it may write a stream of data corresponding to game events and actions as well as other game data to computing device 130.

Figure 1B:
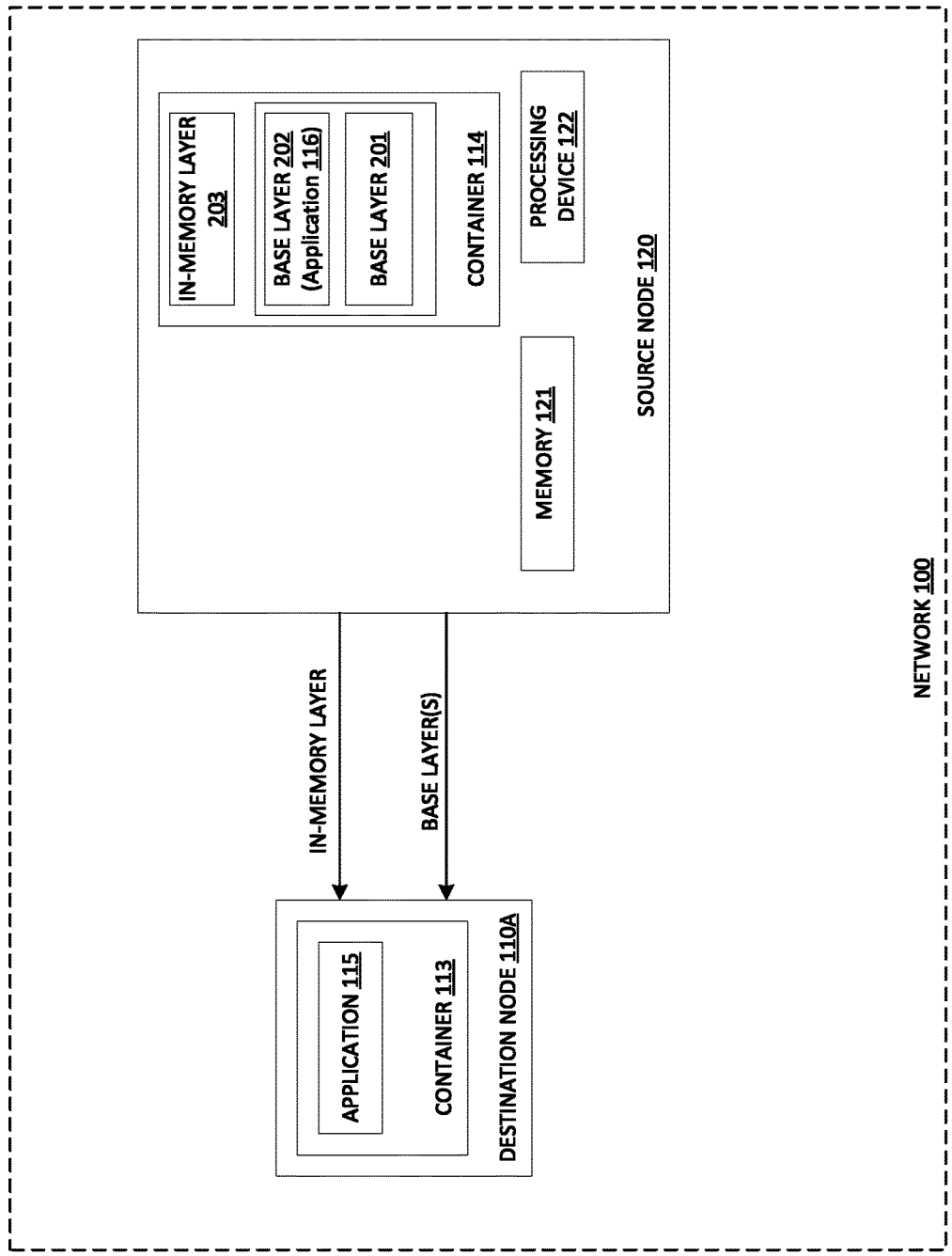
FIG. 1B is a block diagram that illustrates an example network, in accordance with some embodiments of the present disclosure.

As further illustrated in FIG. 1A, each computing device 110 may include a container 113, and each container 113 may include an application 115. For example, application 115 may execute in a container 113. Although one application 115 is illustrated in a respective container 113, a container 113 may include multiple applications 115 in other embodiments. Applications 115 may be deployed and managed by a deployment controller (not illustrated in the figures) executing as part of a network virtualization platform (not illustrated in the figures), for example. FIG. 1B illustrates a simplified version of the network 100 of FIG. 1A. In FIG. 1B, computing device 120 may be referred to as source node 120, while computing device 110A may be referred to as destination node 110A. As illustrated in FIG. 1B, source node 120 may include processing device 122 and memory 121 which may be physical resources that container 114 may utilize. Container 114 may comprise layers 201-203, where layers 201 and 202 are base layers that are part of a container image, and layer 203 is an in-memory layer as discussed in further detail herein.

FIG. 2A is a block diagram that illustrates the container 114 of FIGS. 1A and 1B executing within computing device 120, in accordance with some embodiments of the present disclosure. As discussed above, the container 114 may execute on computing device 120. In one embodiment, the container 114 may be an isolated set of resources allocated to executing an application, software, and/or process independent from other applications, software, and/or processes. The host OS 221 may use namespaces to isolate the resources of containers from each other. In another embodiment, the container 114 may be a virtualized object similar to a virtual machine. However, container 114 may not implement a separate guest OS. The container 114 may share the kernel, libraries, and binaries of the host OS 221 with other containers (not shown) that are executing on the computing device 120. Although FIG. 2A illustrates one container 114, the computing device 120 may include multiple containers in other embodiments. Each container may have one or more respective filesystems, memories, devices, network ports, etc., for accessing the physical resources of the computing device 120 (e.g., processing device 122 and memory 121, shown in FIG. 1B).

In some embodiments, the container engine 222 may allow different containers to share the host OS 221 (e.g., the OS kernel, binaries, libraries, etc.) of the computing device 120. For example, the container engine 222 may multiplex the binaries and/or libraries of the host OS 221 between multiple containers. The container engine 222 may also facilitate interactions between the container 114 and the resources of the computing device 120. For example, the container engine 222 may manage requests from container 114 to access a memory (e.g., a RAM) of the computing device 120. In another example, the container engine 222 may manage requests from the container 114 to access certain libraries/binaries of the host OS 221. In other embodiments, the container engine 222 may also be used to create, remove, and manage containers. In one embodiment, the container engine 222 may be a component of the host operating system 221. In another embodiment, container engine 222 may run on top of the host operating system 221, or may run directly on host hardware without the use of a host operating system 221. In yet other embodiments, container engine 222 may be a component of a network virtualization platform (not shown), that runs on host OS 211.

As illustrated in FIG. 2A, application 116 may execute within the container 114. For example, the application 116 may execute within a runtime environment (not shown in the figures) of the container 114. Both the container 114 and the application 116 may be created by a network virtualization platform (not shown). The network virtualization platform, via the computing device 120 may provide administrators and users with the capability to configure and deploy a variety of applications and/or network functions within containers. The application 116 may be any application which requires large amounts of data to be stored in-memory during execution. For example, application 116 may be a video game (e.g., mobile game, online game etc.), a data analytics application, or a data processing application etc.

Container engine 222 may provide an image-based deployment module for creating containers and may store one or more image files for creating container instances. Each image file may include a series of layers, which may be combined into a single image as discussed in further detail herein. A new layer is created when the image changes. For example, whenever a user specifies a command, such as "run" or "copy," a new layer may be created.

Container engine 222 may include a storage driver (not shown), such as OverlayFS, to manage the contents of a container including the read only and writable (e.g. in-memory) layers of the container. The storage driver may be a type of union file system which allows a developer to overlay one layer on top of another. Changes (e.g., data to be written) may be recorded in the upper-most layer (e.g., the in-memory layer), while the lower layer(s) (e.g., base images) remain unmodified. In this way, multiple containers may share an image file that includes base layers that are read-only.

FIG. 2B illustrates an example image file 200 that the container 114 may be generated from. The image file 200 may be stored by the container engine 222 illustrated in FIG. 2A. As illustrated in FIG. 2B, image file 200 may include base layers 201 and 202. Image file 200 may be shared by multiple containers. When the container engine 222 creates a new container, it may add a new writable (e.g., in-memory) layer on top of the underlying base layers. This new writable layer is illustrated as the in-memory layer 203 in FIG. 2B. When the container is deleted, the in-memory layer 203 is also deleted. However, the underlying image file 200 remains unchanged. Although illustrated as having two base layers for simplicity, image file 200 may include any suitable number of base layers. Base layers may define the runtime environment as well as the packages and utilities necessary for a containerized application to run. In the example of FIG. 2B, base layer 201 may comprise an operating system (e.g., the Windows™ operating system or the Linux™ operating system) on which the application 116 may run. The base layer 202 may comprise the application 116 itself. Stated differently, base layer 202 may comprise the packages and utilities necessary for the application 116 to run. In some embodiments, the application 116 may be any application that writes significant amounts of data in-memory. For example, application 116 may be a video game (e.g., mobile game, online game etc.), a data analytics application, or a data processing application etc. Thus, base layers 201 and 202 may each comprise static snapshots of the container 114's configuration and may be read-only layers that are never modified. Any changes (e.g., data to be written by the application 116) may be implemented in subsequent (upper) layers such as in-memory layer 203. Changes made in the in-memory layer 203 may be saved by creating a new layered image.

Referring back to both FIGS. 1A and 1B, memory 121 may include container migration module 121A (hereinafter referred to as module 121A), which computing device 120 may execute (via processing device 122) to perform one or more of the functions described herein for migrating the in-memory layer of a container. For example, upon determining that it must be decommissioned (e.g., due to high latency, modification of its hardware, and/or energy consumption requirements), computing device 120 may execute the module 121A in order to migrate the in-memory layer of container 114 to another host machine (e.g., a computing device 110). Computing device 120 may first determine a destination node to which container 114 may be migrated. Simultaneously with the writing of a stream of data by application 116 to computing device 130, Computing device 120 may retrieve the container metadata for container 114, which may be any suitable data that a destination node (e.g., a computing device 110) may consider relevant in determining whether it can provision a replica of the container 114. For example, container metadata of container 114 may include the memory usage, processor usage, input/output operation usage (e.g., number of writes and reads from storage media), storage bandwidth usage (amount of data written/read), network bandwidth usage, and indications of the base image layers used (e.g., as hashes to reduce the metadata size) by container 114, as well as any other appropriate resource usage data. Computing device 120 may transmit an availability request including the container metadata of container 114 to each computing device 110, to determine which computing device 110 is the most appropriate node (i.e. the destination node) on which to provision a replica of container 114 (e.g., the most appropriate destination node to migrate container 114 to). In some embodiments, the computing devices 110 may form a peer group that the computing device 120 may poll to identify a suitable destination node on which a replica of container 114 may be created. The availability request may ask each receiving computing device 110 to compare the container metadata included in the request to their own system resources to determine whether they have sufficient resources (e.g., sufficient memory, processor availability, input/output bandwidth, storage bandwidth, and network bandwidth) to provision a replica of the container 114.

Each computing device 110 may reply with an availability response indicating whether they have sufficient resources to provision a replica of the container 114, and if so, an amount of each resource indicated in the availability request. For example, an availability response may include an indication of whether the computing device 110 has sufficient resources (e.g., "yes" or "no") and if so, the amount of each resource available including available memory, processor availability, available input/output bandwidth, available storage bandwidth, and available network bandwidth. The availability response may also include information about whether the computing device 110 is performing any functions that will affect its available resources, such as an indication of whether the computing device 110 is deprovisioning (i.e. is powering off or shutting down), for example. In some embodiments, computing device 120 may select as the destination node the computing device 110 with the most total resources available for provisioning a replica of container 114. In other embodiments, computing device 120 may weigh certain resources such as (e.g.), available memory more than others. For example, if available memory is weighed the heaviest, computing device 120 may select as the destination node a computing device 110 that has the most available memory, as long as that computing device 110 also has a sufficient amount of each of the other resources to provision the replica of container 114.

Referring also to FIG. 2B, in some embodiments, upon selecting a destination node for provisioning a replica of container 114 (in the example of FIGS. 1A and 1B, computing device 110A is selected), computing device 120 may determine whether computing device 110A includes any of the base layers 201 and 202 used by container 114. As used herein, determining whether computing device 110A includes any of the base layers 201 and 202 used by container 114 refers to determining whether computing device 110A includes its own copy or replica of each of the base layers 201 and 202. Computing device 120 may query computing device 110A as to which of the base layers 201 and 202 it includes, if any. The more base layers utilized by container 114 that computing device 110A already has, the less data must be transmitted from computing device 120 to the computing device 110A because the computing device 110A (i.e. the destination node) already has one or more base layers used by the container 114. In the example of FIG. 2B, base layer 201 may comprise the Windows™ operating system, although any suitable operating system may be used (e.g., the Linux™ operating system) and base layer 202 may comprise application 116 (e.g., the packages and utilities for running application 116). In the example of FIGS. 1A and 1B, computing device 110A may utilize the Windows™ operating system (e.g., may include a container image file having a base layer comprising the Windows™ operating system) and thus may already include base layer 201. However, computing device 110A may not include application 116 that base layer 202 is comprised of and may thus be missing base layer 202. Stated differently, computing device 110A may not include the packages and utilities for running application 116 and thus may be missing base layer 202. Thus computing device 110A may respond to computing device 120 with an indication that it includes base layer 201 but not base layer 202. The process of determining which base layers used by container 114 that computing device 110A already has replicas of (if any) may be referred to as synchronization.

In other embodiments, computing device 120 may include in the availability request, a query as to whether computing device 110A already includes one or more of the base layers used by the container 114 as indicated in the container metadata. Each computing device 110 may include as part of their availability response, an indication of whether they have each of the base layers 201 and 202. Computing device 120 may account for the number of base layers indicated in the container metadata that a computing device 110 already has when determining a destination node. This is because the more base layers utilized by container 114 that a computing device 110 already has, the less data must be transmitted between computing device 120 and the computing device 110. In addition, a computing device 110 that already includes a number of the base layers used by the container 114 may require less available resources to provision a replica of container 114 than a computing device 110 that does not already include one or more of the base layers utilized by the container 114. In the example of FIGS. 1A and 1B, computing device 110A may have the most available resources, and may already include base layer 201. Computing device 120 may determine based on the availability response from each computing device 110 that computing device 110A has the most resources available for provisioning a replica of container 114 and may select computing device 110A as the destination node.

Upon determining the destination node (in the example of FIGS. 1A and 1B, computing device 110A), and the base layers utilized by container 114 that the computing device 110A already has, computing device 120 may transmit each base layer that computing device 110A is missing to computing device 110A. In the example of FIGS. 1A and 1B, computing device 120 may determine that computing device 110A already contains base layer 201 but is missing base layer 202 as described above, and transmit base layer 202 to computing device 110A. As used herein, transmitting a base layer or in-memory layer of a container to a destination device may refer to generating a replica of the layer and transmitting the replica of the layer to the destination device. Computing device 120 may utilize any suitable tool for synchronizing and transmitting files such as the base layer 202. For example, computing device 120 may use the Rsync utility to synchronize and transmit base layer 202 to computing device 110A. In some embodiments, computing device 120 may archive all of the base layers that need to be transmitted to computing device 110A into a single file and transmit the file to the computing device 110A using any suitable file transfer and synchronization mechanism.

In some embodiments, the computing device 110A may already include each of the base layers 201 and 202 (e.g., may already include the Windows™ operating system and the video game—i.e. application 116), and may indicate this in its availability response. In other embodiments, computing device 110A may indicate that it already includes each of the base layers 201 and 202 in response to being polled by computing device 120 as to whether it comprises base layers 201 and 202 (e.g., during a synchronization process). In this case, no transmission of base layers is necessary.

Computing device 120 may determine whether the base image(s) were successfully transmitted to the computing device 110A. For example, computing device 120 may wait for an acknowledgement response from computing device 110A indicating that each of the base layers transmitted by computing device 120 was successfully received. In other examples, computing device 110A may transmit an acknowledgement response for each base layer it successfully received and an error response for each base layer that was not successfully received. If one or more of the base layers was not successfully received by computing device 110A, then computing device 120 may re-transmit the base layers that were not successfully received. In some embodiments, computing device 120 may attempt to transmit the base layers a pre-configured number of times, and if all of the base layers computing device 110A is missing are not successfully transmitted within the pre-configured number of attempts, computing device 120 may stop attempting to transmit the base layer(s) to computing device 110A and may select a new destination node.

Once computing device 120 receives an indication that each of the base layers (in the example of FIGS. 1A and 1B, base layer 202) was successfully transmitted to the computing device 110A, it may halt the stream of data being written to the computing device 130 by application 116. Computing device 120 may synchronize (e.g., may determine if computing device 110A includes all or part of in-memory layer 203) and transmit the in-memory layer 203 to computing device 110A. Computing device 120 may use any suitable tool for synchronizing and transmitting files as discussed above. In some embodiments, computing device 120 may take a snapshot of the container 114, and remove base layers 201 and 202 from the snapshot, such that the snapshot comprises the in-memory layer 203. Computing device 120 may then transmit the snapshot to computing device 110A. Upon receiving (a replica of) the in-memory layer 203, computing device 110A may include replicas of base layers 201 and 202 and a replica of in-memory layer 203 and may start a new container 113 using the replicas of base layers 201 and 202 and the replica of in-memory layer 203. The container 113 may be a replica of container 114 and may host an application 115 that is a replica of application 116.

Base layers are generally significantly larger than an in-memory layer in terms of storage size. Thus, by waiting until the base layers 201 and 202 have been successfully transmitted to the computing device 110A before halting the stream of data from application 116 to the computing device 130, the amount of time the data stream being written to the computing device 130 must be interrupted may be minimized. In addition, computing device 120 may wait until the moment right before the stream of data being written to computing device 130 by application 116 is halted before synchronizing and transmitting base layer 202. As a result, the computing device 130 may not need to restart from a previous saved state of the application 116, even if one exists.

Computing device 120 may instruct the computing device 130 (client node) to disconnect from it and connect to the computing device 110A. Upon the computing device 130 successfully connecting to the computing device 110A, application 115 may continue writing the stream of data (previously being written by application 116) to the computing device 130.

Figure 3:
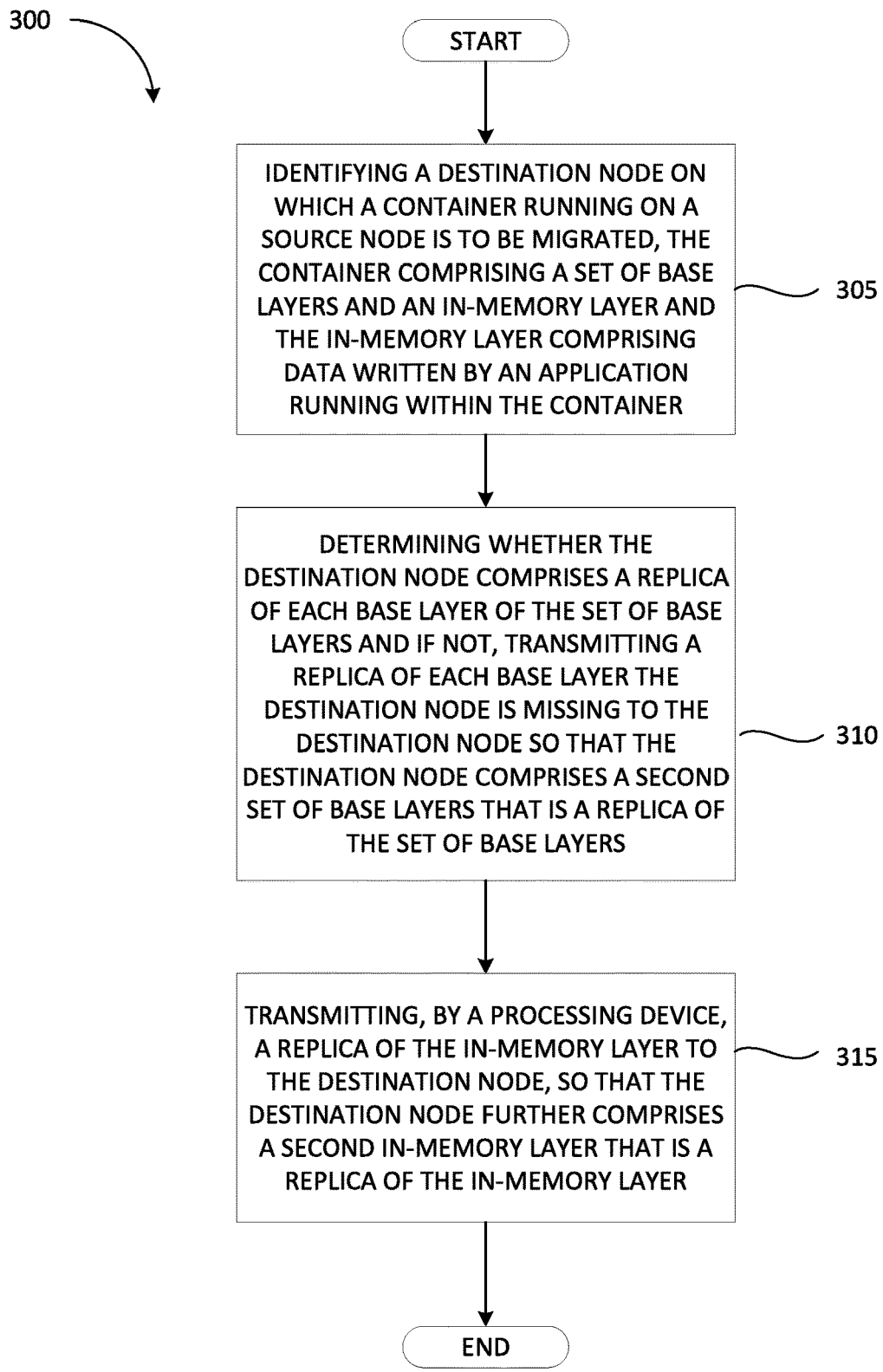
FIG. 3 is a flow diagram of a method of transferring the in-memory layer of a container from a source node to a destination node, in accordance with some embodiments of the present disclosure.

FIG. 3 is a flow diagram of a method 300 of transferring the in-memory layer of a container from a source node to a destination node, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 120 illustrated in FIG. 1A).

Referring simultaneously to FIGS. 1A and 1B, the method 300 begins at block 305, where the computing device 120 (the source node) may identify a destination node on which container 114 (running on computing device 120) is to be replicated (or, stated differently, to which container 114 is to be migrated). Container 114 may comprise a set of base layers 201 and 202 and an in-memory layer 203. The in-memory layer 203 may comprise data written by an application running within the container. Simultaneously with the writing of a stream of data by application 116 to computing device 130, computing device 120 may retrieve the container metadata for container 114, which may be any suitable data that a destination node (e.g., a computing device 110) may consider relevant in determining whether it can provision a replica of the container 114. For example, container metadata of container 114 may include the memory usage, processor usage, input/output operation usage (e.g., number of writes and reads from storage media), storage bandwidth usage (amount of data written/read), network bandwidth usage, and indications of the base image layers used (e.g., as hashes to reduce the metadata size) by container 114, as well as any other appropriate resource usage data. Computing device 120 may transmit an availability request including the container metadata of container 114 to each computing device 110, to determine which computing device 110 is the most appropriate destination node on which to provision a replica of container 114. In some embodiments, the computing devices 110 may form a peer group that the computing device 120 may poll to identify a suitable destination node on which a replica of container 114 may be created. The availability request may request each receiving computing device 110 to compare the container metadata included in the request to their own system resources to determine whether they have sufficient resources (e.g., sufficient memory, processor availability, input/output bandwidth, storage bandwidth, and network bandwidth usage to provision a replica of the container 114.

Each computing device 110 may reply with an availability response indicating whether they have sufficient resources to provision a replica of the container 114, and if so, an amount of each resource indicated in the availability request. For example, an availability response may include an indication of whether the computing device 110 has sufficient resources (e.g., "yes" or "no") and if so, the amount of each resource available including available memory, processor availability, input/output bandwidth, storage bandwidth, and network bandwidth. The availability response may also include information about whether the computing device 110 is performing any functions that will affect its available resources, such as an indication of whether the computing device 110 is deprovisioning, among others. In some embodiments, computing device 120 may select as the destination node the computing device 110 with the most total resources available for provisioning a replica of container 114. In other embodiments, computing device 120 may weigh certain resources such as available memory more than others. For example, if available memory is weighed the heaviest, computing device 120 may select as the destination node a computing device 110 that has the most available memory, as long as that computing device 110 also has a sufficient amount of each of the other resources to provision the replica of container 114.

At block 310, upon selecting a destination node for provisioning a replica of container 114 (in the example of FIG. 1A, computing device 110A is selected), computing device 120 may determine whether computing device 110A includes any of the base layers 201 and 202 used by container 114, if any, and transmit a replica of each missing base layer to computing device 110A. As used herein, determining whether computing device 110A includes any of the base layers 201 and 202 used by container 114 refers to determining whether computing device 110A includes its own copy or replica of each of the base layers 201 and 202. Computing device 120 may query computing device 110A as to which of the base layers 201 and 202 it includes, if any. The more base layers utilized by container 114 that computing device 110A already has, the less data must be transmitted from computing device 120 to the computing device 110A because the computing device 110A (i.e. the destination node) already has one or more base layers used by the container 114. In the example of FIG. 2B, base layer 201 may comprise the Windows™ operating system, although any suitable operating system may be used (e.g., the Linux™ operating system) and base layer 202 may comprise application 116 (e.g., the packages and utilities for running application 116). In the example of FIGS. 1A and 1B, computing device 110A may utilize the Windows™ operating system (e.g., may include a container image file having a base layer comprising the Windows™ operating system) and thus may already include base layer 201. However, computing device 110A may not include application 116 that base layer 202 is comprised of and may thus be missing base layer 202. Stated differently, computing device 110A may not include the packages and utilities for running application 116 and thus may be missing base layer 202. Thus computing device 110A may respond to computing device 120 with an indication that it includes base layer 201 but not base layer 202. The process of determining which base layers used by container 114 that computing device 110A already has replicas of (if any) may be referred to as synchronization.

In other embodiments, computing device 120 may include in the availability request, a query as to whether computing device 110A already includes one or more of the base layers used by the container 114 as indicated in the container metadata. Each computing device 110 may include as part of their availability response, an indication of whether they have each of the base layers 201 and 202. Computing device 120 may account for the number of base layers indicated in the container metadata that a computing device 110 already has when determining a destination node. This is because the more base layers utilized by container 114 that a computing device 110 already has, the less data must be transmitted between computing device 120 and the computing device 110. In addition, a computing device 110 that already includes a number of the base layers used by the container 114 may require less available resources to provision a replica of container 114 than a computing device 110 that does not already include one or more of the base layers utilized by the container 114. In the example of FIGS. 1A and 1B, computing device 110A may have the most available resources, and may already include base layer 201. Computing device 120 may determine based on the availability response from each computing device 110 that computing device 110A has the most resources available for provisioning a replica of container 114 and may select computing device 110A as the destination node.

Upon determining the destination node (in the example of FIGS. 1A and 1B, computing device 110A), and the base layers utilized by container 114 that the computing device 110A is missing, computing device 120 may transmit each base layer that computing device 110A is missing to computing device 110A. In the example of FIGS. 1A and 1B, computing device 120 may determine that computing device 110A already contains base layer 201 but is missing base layer 202 as described above, and transmit base layer 202 to computing device 110A. As used herein, transmitting a base layer or in-memory layer of a container to a destination device may refer to generating a replica of the layer and transmitting the replica of the layer to the destination device. In some embodiments, computing device 120 may determine which base layers computing device 110A is missing based on its availability response, as discussed above. Computing device 120 may utilize any suitable tool for synchronizing and transmitting files such as the base layer 202. For example, computing device 120 may use the Rsync utility to synchronize and transmit base layer 202 to computing device 110A. In some embodiments, computing device 120 may archive all of the base layers that need to be transmitted to computing device 110A into a single file and transmit the file to the computing device 110A using any suitable file transfer and synchronization mechanism.

In some embodiments, the computing device 110A may already include each of the base layers 201 and 202 (e.g., may already include the Windows' operating system and the video game—i.e. application 116), and may indicate this in its availability response. In other embodiments, computing device 110A may indicate that it already includes each of the base layers 201 and 202 in response to being polled by computing device 120 as to whether it comprises base layers 201 and 202 (e.g., during a synchronization process). In this case, no transmission of base layers is necessary.

Computing device 120 may determine whether the base image(s) were successfully transmitted to the computing device 110A. For example, computing device 120 may wait for an acknowledgement response from computing device 110A indicating that each of the base layers transmitted by computing device 120 was successfully received. In other examples, computing device 110A may transmit an acknowledgement response for each base layer it successfully received and an error response for each base layer that was not successfully received. If one or more of the base layers was not successfully received by computing device 110A, then computing device 120 may re-transmit the base layers that were not successfully received. In some embodiments, computing device 120 may attempt to transmit the base layers a pre-configured number of times, and if all of the base layers computing device 110A is missing are not successfully transmitted within the pre-configured number of attempts, computing device 120 may stop attempting to transmit the base layer(s) to computing device 110A and may select a new destination node.

At block 315, computing device 120 may transmit a replica of the in-memory layer 203 of the container 114 to the computing device 110A. More specifically, upon receiving an indication that each of the base layers (in the current example, base layer 202) was successfully transmitted to the computing device 110A, computing device 120 may halt the stream of data being written to the computing device 130 by application 116. Computing device 120 may synchronize (e.g., may determine if computing device 110A includes all or part of in-memory layer 203) and transmit the in-memory layer 203 to computing device 110A. Computing device 120 may use any suitable tool for synchronizing and transmitting files as discussed above. In some embodiments, computing device 120 may take a snapshot of the container 114, and remove base layers 201 and 202 from the snapshot, such that the snapshot comprises the in-memory layer 203. Computing device 120 may then transmit the snapshot to computing device 110A.

Figure 4:
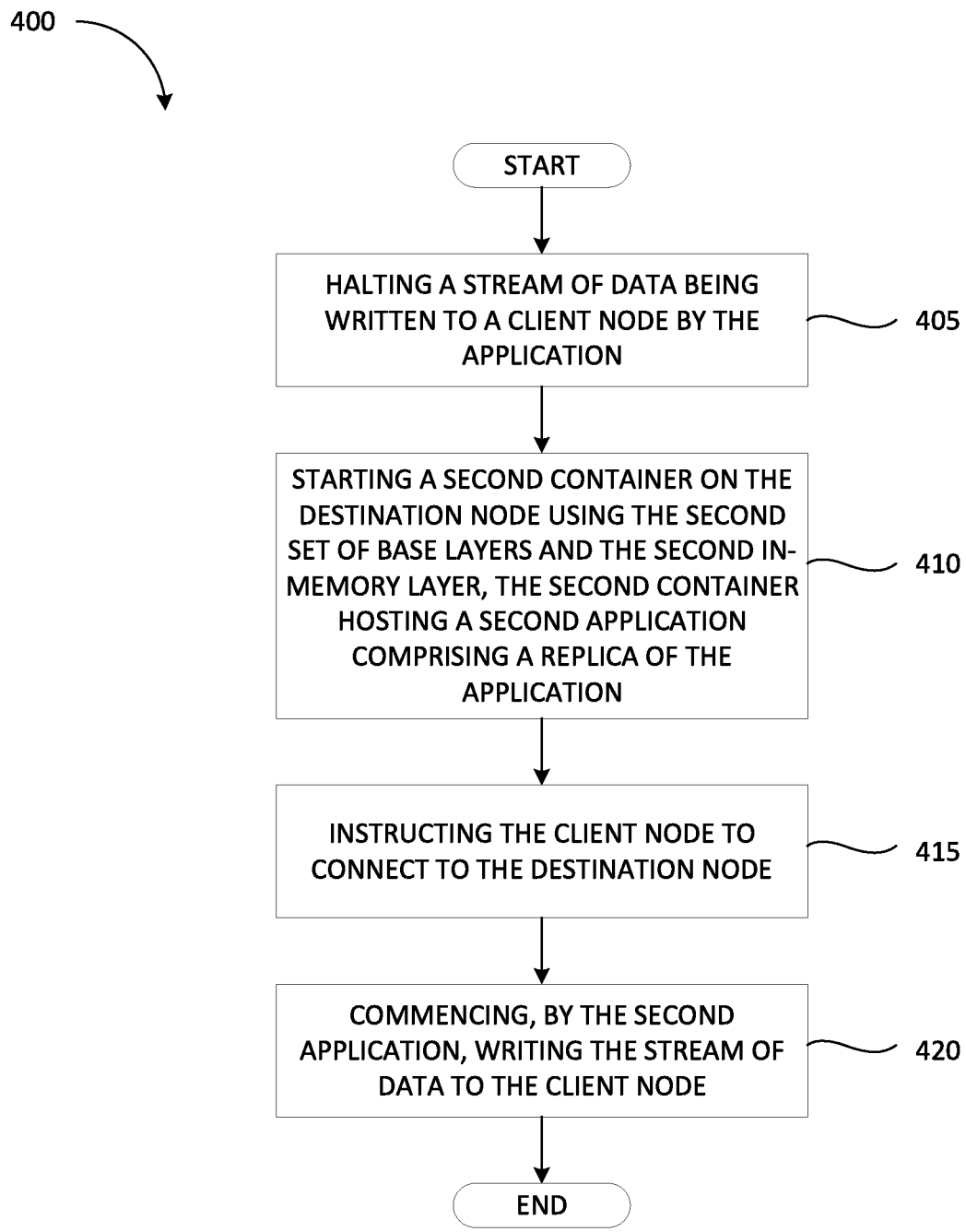
FIG. 4 is a flow diagram of a method of migrating an in-memory layer of a container to another node, in accordance with some embodiments of the present disclosure.

FIG. 4 is a flow diagram of a method 400 of migrating an in-memory layer of a container to another node, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device(s) (e.g., computing device 120 and computing device 110A illustrated in FIGS. 1A and 1B).

Referring simultaneously to FIGS. 1A and 1B as well, at block 405, upon receiving acknowledgement of receipt of the in-memory layer 203 from computing device 110A, computing device 120 may halt the stream of data being written to computing device 130 by application 116. Upon receiving the replica of the in-memory layer 203, computing device 110A may include replicas of base layers 201 and 202 and a replica of in-memory layer 203 and at block 410 may start a new container 113 using the replicas of base layers 201 and 202 and the replica of in-memory layer 203. The container 113 may be a replica of container 114 and may host an application 115 that is a replica of application 116.

Base layers are generally significantly larger than an in-memory layer in terms of storage size. Thus, by waiting until the base layers 201 and 202 have been successfully transmitted to the computing device 110A before halting the stream of data from application 116 to the computing device 130, the amount of time the data stream being written to the computing device 130 must be interrupted may be minimized. In addition, computing device 120 may wait until the moment right before the stream of data being written to computing device 130 by application 116 is halted before synchronizing and transmitting base layer 202. As a result, the computing device 130 does not need to restart from a previous saved state of the application 116, even if one exists.

At block 415, computing device 120 may instruct the computing device 130 (client node) to disconnect from it and connect to the computing device 110A. Upon the computing device 130 successfully connecting to the computing device 110A, at block 420 application 115 may continue writing the stream of data (previously being written by application 116) to the computing device 130.

Figure 5:
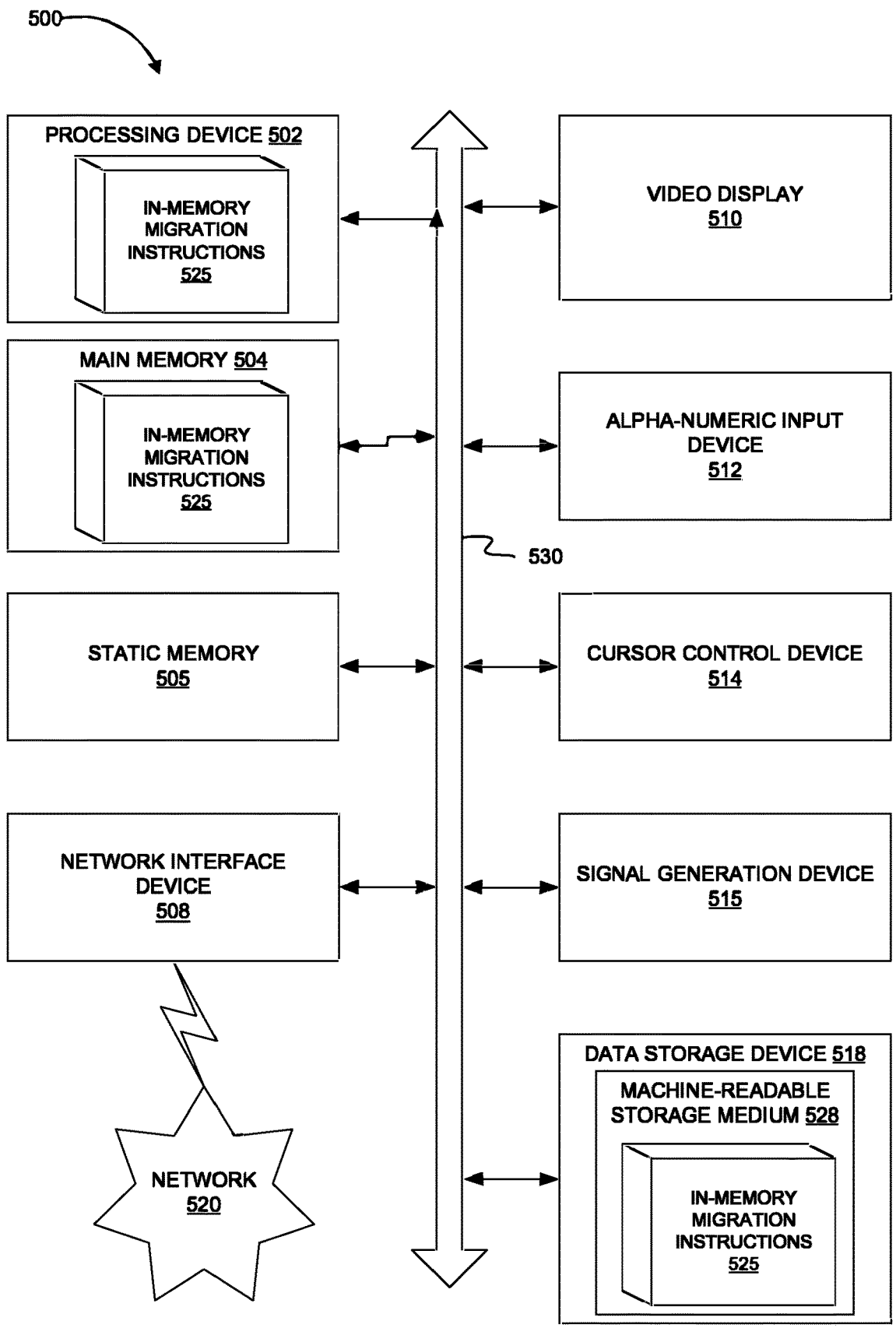
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for migrating the in-memory state of a containerized application to a destination node. More specifically, the machine may identify, from among a set of peer nodes, a destination node on which a container currently running on a source node is to be replicated. The container may include a set of base layers and an in-memory layer (e.g., a writable layer) in which data written by an application running within the container may be stored. The application may be any application that writes significant amounts of data to the in-memory layer of the container, such as video games, data analytics applications, and real-time data processing applications. The data written in-memory may be streamed to a client device by the application, in one example. The machine may determine whether the destination node includes a replica of each base layer of the set of base layers and if not, may transmit a replica of each base layer the destination node is missing to the destination node so that the destination node may include a second set of base layers that is a replica of the set of base layers. Upon successful transfer of the replica base layers to the destination node, the machine may halt the stream of data from the application to the client device, and transfer a replica of the in-memory layer of the container to the destination node so that the destination node further includes a second in-memory layer that is a replica of the in-memory layer.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute in-memory migration instructions 525, for performing the operations and steps discussed herein.

The data storage device 518 may include a machine-readable storage medium 528, on which is stored one or more sets of in-memory migration instructions 525 (e.g., software) embodying any one or more of the methodologies of functions described herein, including instructions to cause the processing device 502 to execute scripts 121A shown in FIG. 1A. The in-memory migration instructions 525 may also reside, completely or at least partially, within the main memory 504 or within the processing device 502 during execution thereof by the computer system 500; the main memory 504 and the processing device 502 also constituting machine-readable storage media. The in-memory migration instructions 525 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
transmitting an availability request to each of one or more nodes, the availability request including metadata indicating resource usage of a container to be migrated;
identifying a destination node to which the container is to be migrated based on a response from each of the one or more nodes indicating an amount of resources available to provision a replica of the container;
determining whether the destination node comprises a replica of each base layer of a set of base layers of the container and if not, transmitting a replica of each base layer the destination node is missing to the destination node;
acquiring a snapshot of the container;
removing the set of base layers from the snapshot to generate a replica of an in-memory layer; and transmitting, by a processing device, the replica of the in-memory layer to the destination node, so that the destination node further comprises a second in-memory layer that is a replica of the in-memory layer and a second set of base layers that is a replica of the set of base layers.

2. The method of claim 1, further comprising:
halting a stream of data being written to a client node by an application running within the container;
starting a second container on the destination node using the second set of base layers and the second in-memory layer, the second container hosting a second application comprising a replica of the application;
instructing the client node to connect to the destination node; and
commencing, by the second application, writing the stream of data to the client node.

3. The method of claim 2, wherein the in-memory layer comprises data written by the application and the set of base layers comprises packages and utilities necessary for the application to run.

4. The method of claim 2, wherein the application comprises a video game.

5. The method of claim 2, wherein the set of base layers comprises:
a first base layer comprising an operating system on which the application is running; and
a second base layer comprising the application.

6. The method of claim 1, wherein identifying the destination node comprises:
identifying the destination node from the one or more nodes based at least in part on the amount of resources each of the one or more nodes has available to provision the replica of the container.

7. The method of claim 6, wherein the metadata comprises one or more of: memory usage of the container, processor usage of the container, input/output operation usage of the container, storage bandwidth usage of the container, network bandwidth usage of the container, and base image layers used by the container.

8. A system comprising:
a memory; and
a processing device operatively coupled to the memory, the processing device to:
transmit an availability request to each of one or more nodes, the availability request including metadata indicating resource usage of a container to be migrated;
identify a destination node to which the container is to be migrated based on a response from each of the one or more nodes indicating an amount of resources available to provision a replica of the container;
determine whether the destination node comprises a replica of each base layer of a set of base layers of the container and if not, transmitting a replica of each base layer the destination node is missing to the destination node;
acquire a snapshot of the container;
remove the set of base layers from the snapshot to generate a replica of an in-memory layer; and
transmit the replica of the in-memory layer to the destination node, so that the destination node further comprises a second in-memory layer that is a replica of the in-memory layer and a second set of base layers that is a replica of the set of base layers.

9. The system of claim 8, wherein the processing device is further to:

halt a stream of data being written to a client node by an application running within the container;
start a second container on the destination node using the second set of base layers and the second in-memory layer, the second container hosting a second application comprising a replica of the application;
instruct the client node to connect to the destination node; and
commence, by the second application, writing the stream of data to the client node.

10. The system of claim 9, wherein the in-memory layer comprises data written by the application and the set of base layers comprises packages and utilities necessary for the application to run.

11. The system of claim 9, wherein the application comprises a video game.

12. The system of claim 9, wherein the set of base layers comprises:
a first base layer comprising an operating system on which the application is running; and
a second base layer comprising the application.

13. The system of claim 8, wherein to identify the destination node, the processing device is to:
identify the destination node from the one or more nodes based at least in part on the amount of resources each of the one or more nodes has available to provision the replica of the container.

14. The system of claim 13, wherein the metadata comprises one or more of: memory usage of the container, processor usage of the container, input/output operation usage of the container, storage bandwidth usage of the container, network bandwidth usage of the container, and base image layers used by the container.

15. A non-transitory computer-readable medium having instructions stored thereon which, when executed by a processing device, cause the processing device to:
transmit an availability request to each of one or more nodes, the availability request including metadata indicating resource usage of a container to be migrated;
identify a destination node to which the container is to be migrated based on a response from each of the one or more nodes indicating an amount of resources available to provision a replica of the container;
determine whether the destination node comprises a replica of each base layer of a set of base layers of the container and if not, transmitting a replica of each base layer the destination node is missing to the destination node;
acquire a snapshot of the container;
remove the set of base layers from the snapshot to generate a replica of an in-memory layer; and
transmit, by the processing device, the replica of the in-memory layer to the destination node, so that the destination node further comprises a second in-memory layer that is a replica of the in-memory layer and a second set of base layers that is a replica of the set of base layers.

16. The non-transitory computer-readable medium of claim 15, wherein the processing device is further to:
halt a stream of data being written to a client node by an application running within the container;
start a second container on the destination node using the second set of base layers and the second in-memory layer, the second container hosting a second application comprising a replica of the application;
instruct the client node to connect to the destination node; and commence, by the second application, writing the stream of data to the client node.

17. The non-transitory computer-readable medium of claim 16, wherein the in-memory layer comprises data written by the application and the set of base layers comprises packages and utilities necessary for the application to run.

18. The non-transitory computer-readable medium of claim 16, wherein the application comprises a video game.

19. The non-transitory computer-readable medium of claim 15, wherein to identify the destination node, the processing device is to:
  identify the destination node from the one or more nodes based at least in part on the amount of resources each of the one or more nodes has available to provision the replica of the container.

20. The non-transitory computer-readable medium of claim 19, wherein the metadata comprises one or more of: memory usage of the container, processor usage of the container, input/output operation usage of the container, storage bandwidth usage of the container, network bandwidth usage of the container, and base image layers used by the container.

\* \* \* \* \*